US008866881B2

(12) United States Patent
Fujita

(10) Patent No.: US 8,866,881 B2
(45) Date of Patent: Oct. 21, 2014

(54) STEREOSCOPIC IMAGE PLAYBACK DEVICE, STEREOSCOPIC IMAGE PLAYBACK SYSTEM, AND STEREOSCOPIC IMAGE PLAYBACK METHOD

(71) Applicant: Fujifilm Corporation, Tokyo (JP)

(72) Inventor: Koudai Fujita, Saitama (JP)

(73) Assignee: Fujifilm Corporation, Tokyo (JP)

( * ) Notice: Subject to any disclaimer, the term of this patent is extended or adjusted under 35 U.S.C. 154(b) by 138 days.

(21) Appl. No.: 13/707,523

(22) Filed: Dec. 6, 2012

(65) Prior Publication Data

US 2013/0094833 A1 Apr. 18, 2013

Related U.S. Application Data

(63) Continuation of application No. PCT/JP2011/060930, filed on May 12, 2011.

(30) Foreign Application Priority Data

Jun. 25, 2010 (JP) ................................. 2010-145104
Dec. 1, 2010 (JP) ................................. 2010-268129

(51) Int. Cl.
*H04N 13/00* (2006.01)
*H04N 13/04* (2006.01)
*H04N 5/222* (2006.01)
*H04N 5/92* (2006.01)
*H04N 5/84* (2006.01)
*H04N 5/89* (2006.01)
*H04N 5/93* (2006.01)

(52) U.S. Cl.
USPC .......... 348/42; 348/51; 348/333.09; 386/326; 386/335; 386/353

(58) Field of Classification Search
USPC .......... 386/326, 335, 353; 348/42, 51, 333.09
See application file for complete search history.

(56) References Cited

U.S. PATENT DOCUMENTS 6,512,892 B1 * 1/2003 Montgomery et al. ....... 396/326
8,610,774 B2 * 12/2013 Onozawa ...................... 348/143

(Continued)

FOREIGN PATENT DOCUMENTS

JP 2004-7396 A 1/2004
JP 2004-207772 A 7/2004

(Continued)

OTHER PUBLICATIONS

International Search Report (ISR) (PCT Form PCT/ISA/210) dated Aug. 2, 2011, in PCT/JP2011/060930.

(Continued)

*Primary Examiner* — Daquan Zhao
(74) *Attorney, Agent, or Firm* — McGinn IP Law Group, PLLC

(57) ABSTRACT

In the case where a parallax of left and right images is not appropriate, an influence on the health caused by stereoscopic viewing is preliminarily prevented. A camera and a television are connected (step S1) and a television size is input from the camera (step S2). A parallax adjustment amount v is created based on the input television size (step S3) and the left and right image data and the parallax adjustment amount v are transmitted to the television (step S4). When the television receives those (step S101), the parallax of the left and right images is adjusted by the parallax adjustment amount v (step S102). A region including the subject having the largest parallax among subjects in the left and right images is clipped and displayed in a small screen with the size of the display unit of the camera (step S103). The user checks the image displayed in the small screen (step S5) and when there is no problem, the left and right images are displayed on all over the television size in a 3D mode (step S104).

21 Claims, 10 Drawing Sheets

(56) References Cited

U.S. PATENT DOCUMENTS

| | | | |
|---|---|---|---|
| 8,687,053 B2 * | 4/2014 | Matsui et al. | 348/51 |
| 2005/0089212 A1 * | 4/2005 | Mashitani et al. | 382/154 |
| 2006/0290778 A1 * | 12/2006 | Kitaura et al. | 348/51 |
| 2007/0257902 A1 * | 11/2007 | Satoh et al. | 345/419 |

FOREIGN PATENT DOCUMENTS

| | | |
|---|---|---|
| JP | 2004-334833 A | 11/2004 |
| JP | 2005-73013 A | 3/2005 |
| JP | 2005-73049 A | 3/2005 |
| WO | WO 2004/030377 A1 | 4/2004 |

OTHER PUBLICATIONS

PCT/ISA/237 (written opinion of the international searching authority with English translation, dated Aug. 2, 2011).
PCT/IB/326.
PCT/IB/338.
PCT/IB/373.

* cited by examiner

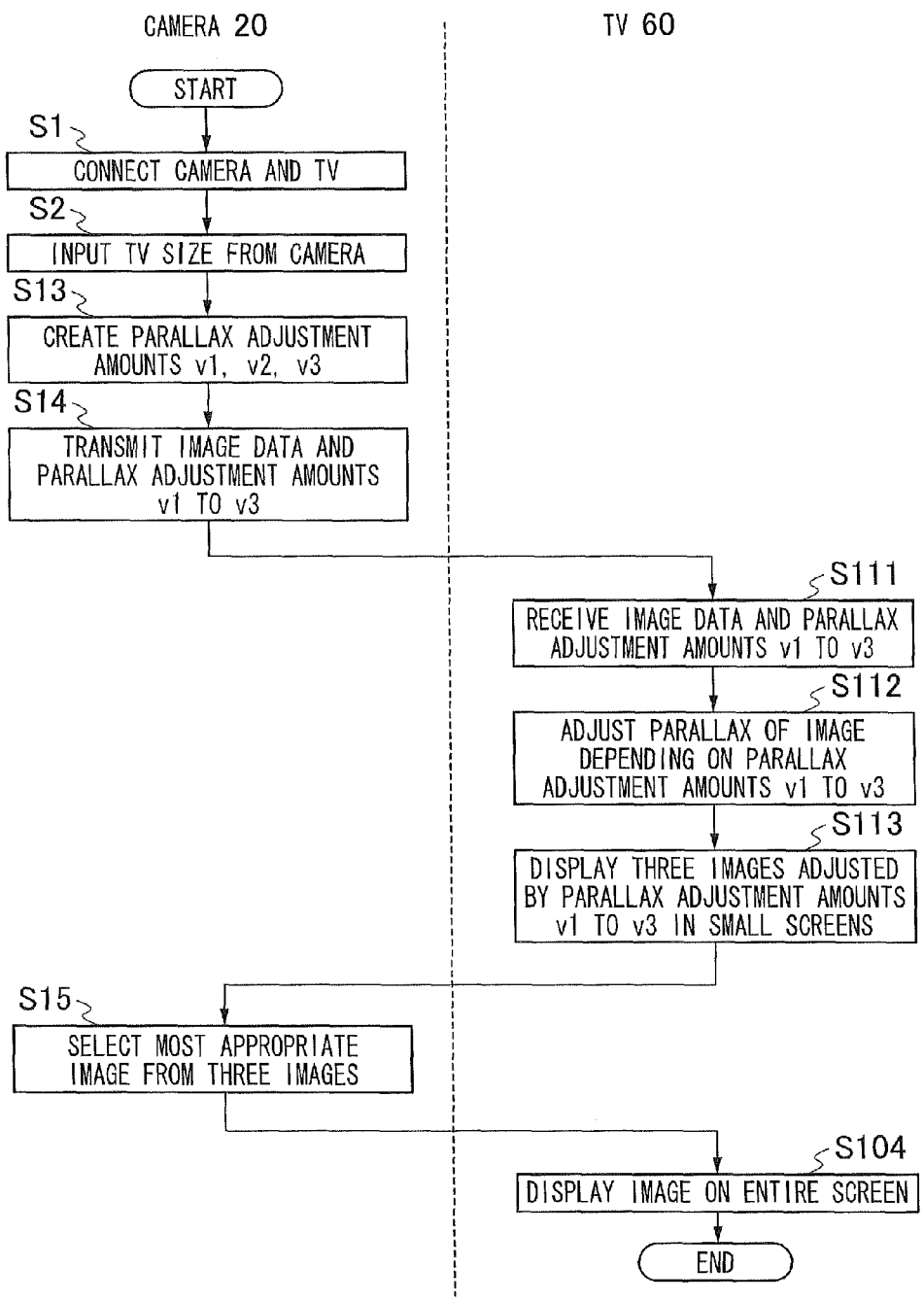

FIG.9

| TV SIZE [inch] | PARALLAX ADJUSTMENT AMOUNT [mm] |
|---|---|
| 20 | △△ |
| 24 | △○ |
| 30 | △× |
| 32 | △■ |
| . | . |
| . | . |
| 100 | ○×■ |

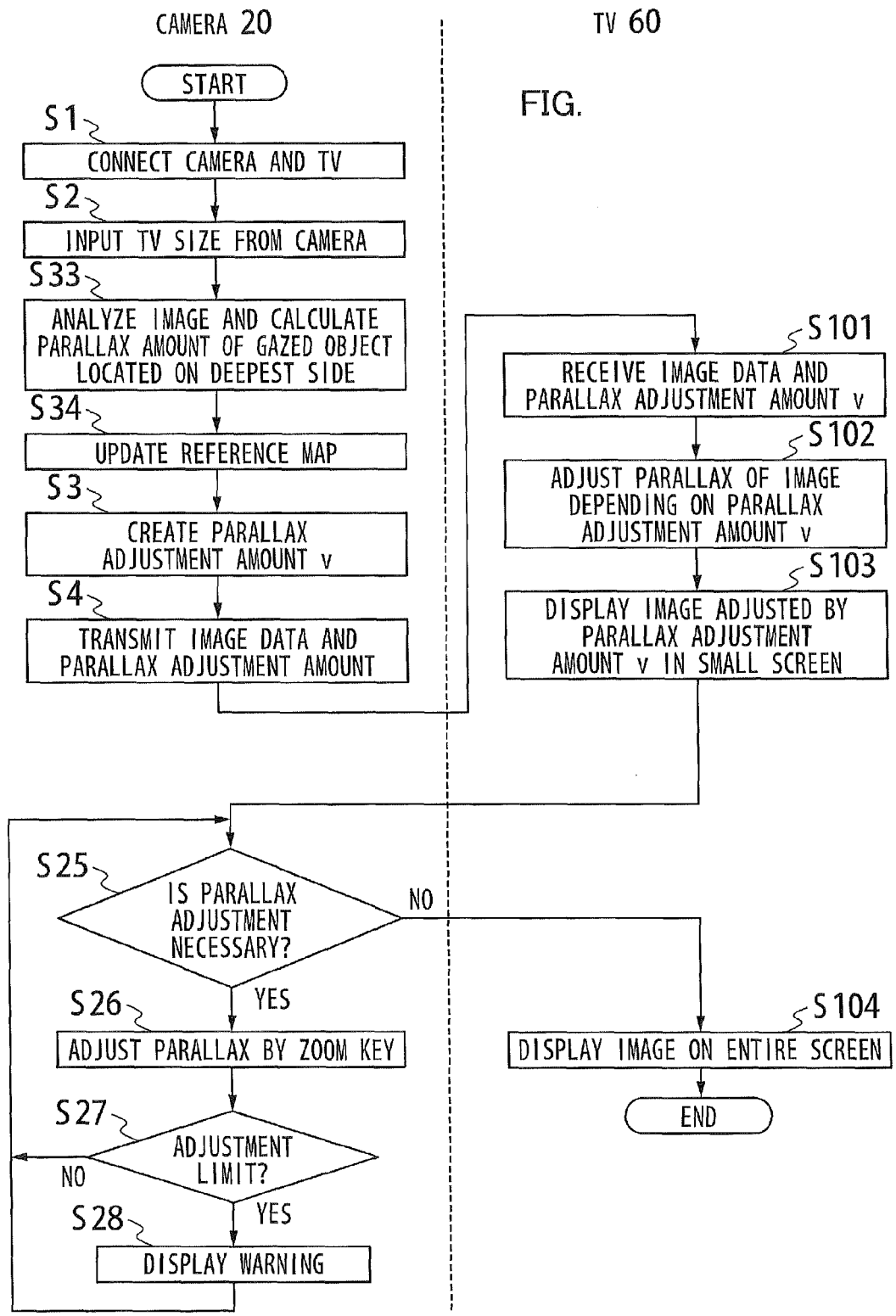

STEREOSCOPIC IMAGE PLAYBACK DEVICE, STEREOSCOPIC IMAGE PLAYBACK SYSTEM, AND STEREOSCOPIC IMAGE PLAYBACK METHOD

CROSS-REFERENCE TO RELATED APPLICATIONS

This application is a PCT Bypass continuation application and claims the priority benefit under 35 U.S.C. §120 of PCT Application No. PCT/JP2011/060930 filed on May 12, 2011 which application designates the U.S., and also claims the priority benefits under 35 U.S.C. §119 of Japanese Patent Applications: Nos. 2010-145104 filed on Jun. 25, 2010 and 2010-268129 filed on Dec. 1, 2010, which applications are all hereby incorporated in their entireties by reference.

BACKGROUND OF THE INVENTION

1. Field of the Invention

The presently disclosed subject matter relates to a stereoscopic image playback device, a stereoscopic image playback system and a stereoscopic image playback method, and more particularly to a technology of preliminarily preventing an influence on a health due to stereoscopic viewing.

2. Description of the Related Art

A stereoscopic imaging device acquires an image for a left eye and an image for a right eye by imaging the same subject from left and right view points with the use of two image pickup units arranged so as to have a parallax in a horizontal direction. When the left and right images are input to a 3D display capable of three-dimensional (3D) display and displayed in a manner that the image for the right eye and the image for the left eye can be viewed by the right and left eyes separately, the image can be recognized as a stereoscopic image.

However, there are 3D displays having various screen sizes (display sizes), and there may be a case where a parallax amount between the stored left and right images is not appropriate for the display size of a 3D display which is to reproduce and display the left and right images. In such a case, a pop-up amount and a receding amount from the screen become excessive, and thereby, unfortunately, the image cannot be recognized as a natural stereoscopic image.

To solve such a problem, a technology is described in Japanese patent application laid-open No. 2004-334833 such that an assumed display size acquired form header information of an image file and a size of a display actually displaying the image are compared, and in the case where the actual display size is larger, the image is once displayed in an assumed display size and then enlarged and displayed in an actual display size after a warning is issued.

According to this technology, eye strain due to widening of the parallax can be preliminarily prevented.

SUMMARY OF THE INVENTION

However, according to the technology described in Japanese patent application laid-open No. 2004-334833, it is impossible to set a parallax adjustment amount corresponding to the display size of the 3D display actually displaying the image. That is, a parallax amount of the left and right images enlarged and displayed after the warning is obtained by enlarging a parallax amount of the left and right images stored in the image file according to an enlargement percentage of the image, and whether the enlarged and displayed left and right images can be viewed stereoscopically is not ensured.

In order to solve the above-described problem, it is conceived that a user inputs a display size of the 3D display performing display from a reproduction device side. In this case, the reproduction device calculates a parallax adjustment amount of the left and right images according to the input display size and transmits the calculated parallax adjustment amount together with the left and right image data to the 3D display. When receiving the parallax adjustment amount with the left and right image data, the 3D display may display the left and right images stereoscopically after adjusting the parallax of the left and right images based on the parallax adjustment amount.

Here, assuming that a displacement amount between the left and right images is X and a horizontal width of the images is Y, the parallax amount is defined as X/Y. In the case where images having a parallax amount of 5% on a depth side are displayed on a 100-inch 3D display having an aspect ratio of 4:3, because a horizontal width of a display unit of the 3D display is approximately 2000 mm, the displacement amount between the left and right images is 100 mm equal to 5% of 2000 mm.

Assuming that a distance between the eyes of a human being is 50 mm, because the eyes look outward in stereoscopic viewing the left and right images having a displacement amount of 100 mm in the depth side, a parallax adjustment amount represented as 100 mm−50 mm=50 mm is necessary. Accordingly, when the user inputs the display size of the 3D display as 100 inches, a parallax adjustment amount of the images is 50 mm.

On the other hand, when the above-described images are displayed on a 50-inch 3D display having an aspect ratio of 4:3, in which a horizontal width of a display unit is approximately 1000 mm, a displacement amount of the left and right images is 50 mm equal to 5% of 1000 mm. That is, when the images are displayed on a 50-inch 3D display, parallax adjustment is unnecessary. Accordingly, when the user inputs 50 inches as the display size of the 3D display, a parallax adjustment amount of the images is 0 mm.

However, when the user incorrectly inputs the display size of the 3D display and the parallax adjustment amount is calculated based on the incorrectly input display size, the displacement amount of the left and right images sometimes exceeds the distance between the eyes. For example, the case is described where the user incorrectly inputs the display size as 50 inches though the display size of the actual 3D display is 100 inches when images having a parallax amount of 5% are displayed.

In this case, the reproduction device calculates the parallax adjustment amount as 0 mm. As a result of being displayed on the 100-inch display with the parallax adjustment amount of 0 mm, the displacement amount of the left and right images becomes 100 mm. Since this displacement amount of the left and right images exceeds the distance between the eyes, the right and left eyes look outward in stereoscopic viewing and the eyes take a strain, which results in an occurrence of an influence on the health.

In view of the above-mentioned circumstances, the presently disclosed subject matter has an object to provide a stereoscopic image playback device, a stereoscopic image playback system and a stereoscopic image playback method, which can preliminarily prevent an influence on the health by stereoscopic viewing even in the case where the parallax of the left and right images is not appropriate.

In order to achieve the above-described object, according to a first aspect of the presently disclosed subject matter, there is provided a stereoscopic image playback device configured to reproduce and display a stereoscopic image on a stereoscopic image display device, including: an image acquisition unit configured to acquire a piece of data of a stereoscopic image; a display size acquisition unit configured to acquire a display size of the stereoscopic image display device; a parallax adjustment amount creation unit configured to create, based on the acquired display size, a parallax adjustment amount for adjusting a parallax of the stereoscopic image; a small screen display unit configured to cause the stereoscopic image display device to display the stereoscopic image having a parallax adjusted based on the parallax adjustment amount in a small screen with a size smaller than the display size of the stereoscopic image display device; a determination unit configured to determine, based on the stereoscopic image displayed in the small screen, whether a stereoscopic effect of the stereoscopic image is appropriate; and a display control unit configured to cause, when the determination unit determines that the stereoscopic effect is appropriate, the stereoscopic image display device to display the stereoscopic image having the parallax adjusted based on the parallax adjustment amount with the display size of the stereoscopic image display device.

According to the first aspect, the display size of the stereoscopic image display device is acquired; the parallax adjustment amount is created based on the display size; and the stereoscopic image having the parallax adjusted based on the parallax adjustment amount is displayed in a small screen having the size smaller than the display size to allow a user to select existence or non-existence of problem in stereoscopic viewing. Accordingly, an influence on the health can be preliminarily prevented by the small screen display even in the case where the parallax of the left and right images is not appropriate.

Further, since the stereoscopic image is displayed with the display size in the case where the parallax is appropriate, the user can stereoscopically view the left and right images having appropriate parallax.

According to a second aspect of the presently disclosed subject matter, there is provided the stereoscopic image playback device of the first aspect in which the determination unit includes a selection unit configured to allow a user to select whether the stereoscopic effect is appropriate.

Accordingly, whether a stereoscopic effect is appropriate can be appropriately determined.

According to a third aspect of the presently disclosed subject matter, there is provided the stereoscopic image playback device of the first aspect or the second aspect in which the display control unit causes the stereoscopic image display device to display an image other than the stereoscopic image when the determination unit determines that the stereoscopic effect is not appropriate.

Accordingly, an influence on the health can be prevented.

According to a fourth aspect of the presently disclosed subject matter, there is provided the stereoscopic image playback device of the third aspect in which the display control unit causes the stereoscopic image display device to display a flat image based on the piece of data of the stereoscopic image when the determination unit determines that the stereoscopic effect is not appropriate.

Accordingly, an influence on the health can be prevented.

According to a fifth aspect of the presently disclosed subject matter, there is provided the stereoscopic image playback device of the third aspect or the fourth aspect in which the display control unit causes a warning to be displayed when the determination unit determines that the stereoscopic effect is not appropriate.

Accordingly, a user can recognize that the stereoscopic effect is not appropriate.

In order to achieve the above-described object, according to a sixth aspect of the presently disclosed subject matter, there is provided a stereoscopic image playback device configured to reproduce and display a stereoscopic image on a stereoscopic image display device, including: an image acquisition unit configured to acquire a piece of data of a stereoscopic image; a display size acquisition unit configured to acquire a display size of the stereoscopic image display device; a parallax adjustment amount creation unit configured to create, based on the acquired display size, a plurality of parallax adjustment amounts different from one another for adjusting a parallax of the stereoscopic image; a small screen display unit configured to cause the stereoscopic image display device to display a plurality of stereoscopic images having parallaxes adjusted based on the plurality of parallax adjustment amounts in small screens each with a size smaller than the display size of the stereoscopic image display device; an image selection unit configured to allow a user to select a stereoscopic image having the most appropriate stereoscopic effect from among the plurality of images displayed in the small screens; and a display control unit configured to cause the stereoscopic image display device to display the selected stereoscopic image having the parallax adjusted based on the parallax adjustment amount with the display size of the stereoscopic image display device.

According to the sixth aspect, the display size of the stereoscopic image display device is acquired; the parallax adjustment amounts different form one another are created based on the display size; and a plurality of stereoscopic images having the parallax adjusted based on the plurality of parallax adjustment amounts are displayed in small screens to allow a user to select the stereoscopic image having the most appropriate stereoscopic effect from among the plurality of images displayed in the small screens. Accordingly, the image having appropriate parallax of the left and right images can be selected and viewed stereoscopically.

As described in a seventh aspect of the presently disclosed subject matter, according to the stereoscopic image playback device of the sixth aspect, the display control unit causes the stereoscopic image display device to display an image other than the stereoscopic image in the case where there is no stereoscopic image having the appropriate stereoscopic effect among the plurality of images displayed in the small screens.

Accordingly, an influence on the health can be prevented.

In order to achieve the above-described object, according to an eighth aspect of the presently disclosed subject matter, there is provided a stereoscopic image playback device configured to reproduce and display a stereoscopic image on a stereoscopic image display device, including: an image acquisition unit configured to acquire a piece of data of a stereoscopic image; a display size acquisition unit configured to acquire a display size of the stereoscopic image display device; a parallax adjustment amount creation unit configured to create, based on the acquired display size, a parallax adjustment amount for adjusting a parallax of the stereoscopic image; a small screen display unit configured to cause the stereoscopic image display device to display the stereoscopic image having a parallax adjusted based on the parallax adjustment amount in a small screen with a size smaller than the display size of the stereoscopic image display device; a correction unit configured to allow a user to correct the parallax adjustment amount based on the image displayed in the small screen; and a display control unit configured to cause the stereoscopic image display device to display the stereoscopic image having the parallax adjusted based on the corrected parallax adjustment amount with the display size of the stereoscopic image display device.

According to the eighth aspect of the invention, the display size of the stereoscopic image display device is acquired; the parallax adjustment amount for adjusting the parallax of the stereoscopic image is created based on the display size; and the stereoscopic image having the parallax adjusted based on the parallax adjustment amount is displayed in a small screen to allow a user to correct the parallax adjustment amount based on the image displayed in the small screen. Accordingly, the parallax of the left and right images can be adjusted to the appropriate parallax and viewed stereoscopically.

According to a ninth aspect of the presently disclosed subject matter, there is provided the stereoscopic image playback device of the eighth aspect in which the correction unit includes a restriction unit configured to restrict a correction of a predetermined threshold value or more.

Accordingly, the parallax can be prevented from being increased excessively and an influence on the health can be prevented.

According to a tenth aspect of the presently disclosed subject matter, there is provided the stereoscopic image playback device of the ninth aspect, in which the display control unit causes the stereoscopic image display device to display a warning when a correction amount of the correction unit reaches the predetermined threshold value.

Accordingly, a user can recognize that the parallax is increased excessively in parallax adjustment.

According to an eleventh aspect of the presently disclosed subject matter, there is provided the stereoscopic image playback device of any of the first aspect to the tenth aspect, in which the display size acquisition unit includes an input unit configured to allow a user to input the display size.

According to a twelfth aspect of the presently disclosed subject matter, there is provided the stereoscopic image playback device of any of the first aspect to the eleventh aspect, further including a display unit capable of reproducing and displaying a stereoscopic image, in which the size smaller than the display size of the stereoscopic image display device that is caused to display the image in the small screen by the small screen display unit is the same size as a size of the display unit.

Accordingly, whether the parallax of the images in small screen display is appropriate can be easily determined.

According to a thirteenth aspect of the presently disclosed subject matter, there is provided the stereoscopic image playback device of any of the first aspect to the twelfth aspect, further including a reference map indicating a relationship between the display size of the stereoscopic image display device and the parallax adjustment amount, in which the parallax adjustment amount creation unit creates the parallax adjustment amount based on the reference map.

Accordingly, the parallax adjustment amount can be appropriately created.

According to a fourteenth aspect of the presently disclosed subject matter, there is provided the stereoscopic image playback device of any of the first aspect to the thirteenth aspect, further including an image analysis unit configured to analyze a subject in the stereoscopic images, in which the parallax adjustment amount creation unit creates the parallax adjustment amount based on the analysis result of the image analysis unit.

Accordingly, the parallax adjustment amount can be appropriately created according to the subject in the images.

According to a fifteenth aspect of the presently disclosed subject matter, there is provided the stereoscopic image playback device of the fourteenth aspect, in which the image analysis unit analyzes distance information of the subject in a depth direction of an image.

Accordingly, the parallax adjustment amount can be appropriately created depending on the distance of the subject in the depth direction in the images.

According to a sixteenth aspect of the presently disclosed subject matter, there is provided the stereoscopic image playback device of the fifteenth aspect, in which the small screen display unit clips a region including a gazed object located on the deepest side from the stereoscopic image to cause the stereoscopic image display device to display the region in the small screen.

Accordingly, whether the parallax of the left and right images is appropriate can be determined.

According to a seventeenth aspect of the presently disclosed subject matter, there is provided the stereoscopic image playback device of any of the first aspect to the sixteenth aspect, in which the acquisition unit includes an image pickup unit configured to acquire a plurality of viewpoint images obtained by imaging the same subject from a plurality of viewpoints.

Accordingly, the images taken can be viewed stereoscopically in real time.

In order to achieve the above-described object, according to an eighteenth aspect of the presently disclosed subject matter, there is provided a stereoscopic image playback system including: a stereoscopic image display device including a 3D display having a predetermined size; and a stereoscopic image playback device according to any of the first aspect to the seventeenth aspect.

In order to achieve the above-described object, according to a nineteenth aspect of the presently disclosed subject matter, there is provided a stereoscopic image playback method which causes a stereoscopic image display device to reproduce and display a stereoscopic image, including: an image acquisition step of acquiring a piece of data of a stereoscopic image; a display size acquisition step of acquiring a display size of the stereoscopic image display device; a parallax adjustment amount creation step of creating, based on the acquired display size, a parallax adjustment amount for adjusting a parallax of the stereoscopic image; a small screen display step of causing the stereoscopic image display device to display the stereoscopic image having a parallax adjusted based on the parallax adjustment amount in a small screen with a size smaller than the display size of the stereoscopic image display device; a determination step of determining, based on the stereoscopic image displayed in the small screen, whether a stereoscopic effect of the stereoscopic is appropriate; and a display control step of causing, when it is determined in the determination step that the stereoscopic effect is appropriate, the stereoscopic image display device to display the stereoscopic image having the parallax adjusted based on the parallax adjustment amount with the display size of the stereoscopic image display device.

In order to achieve the above-described object, according to a twentieth aspect of the presently disclosed subject matter, there is provided a stereoscopic image playback method which causes a stereoscopic image display device to reproduce and display a stereoscopic image, including: an image acquisition step of acquiring a piece of data of a stereoscopic image; a display size acquisition step of acquiring a display size of the stereoscopic image display device; a parallax adjustment amount creation step of creating, based on the acquired display size, a plurality of parallax adjustment amounts different from one another for adjusting a parallax of the stereoscopic image; a small screen display step of causing the stereoscopic image display device to display a plurality of stereoscopic images having parallaxes adjusted based on the plurality of parallax adjustment amounts in small screens each with a size smaller than the display size of the stereoscopic image display device; an image selection step of allowing a user to select a stereoscopic image most appropriate for stereoscopic viewing from among the plurality of images displayed in the small screens; and a display control step of causing the stereoscopic image display device to display the selected stereoscopic image having the parallax adjusted based on the parallax adjustment amount with the display size of the stereoscopic image display device.

In order to achieve the above-described object, according to a twenty-first aspect of the presently disclosed subject matter, there is provided a stereoscopic image playback method which causes a stereoscopic image display device to reproduce and display a stereoscopic image, including: an image acquisition step of acquiring a piece of data of a stereoscopic image; a display size acquisition step of acquiring a display size of the stereoscopic image display device; a parallax adjustment amount creation step of creating, based on the acquired display size, a parallax adjustment amount for adjusting a parallax of the stereoscopic image; a small screen display step of causing the stereoscopic image display device to display the stereoscopic image having a parallax adjusted based on the parallax adjustment amount in a small screen with a size smaller than the display size of the stereoscopic image display device; a correction step of allowing a user to correct the parallax adjustment amount based on the image displayed in the small screen; and a display control step of causing the stereoscopic image display device to display the stereoscopic image having the parallax adjusted based on the corrected parallax adjustment amount with the display size of the stereoscopic image display device.

According to the presently disclosed subject matter, the influence on the health by stereoscopic viewing can be preliminarily prevented even in the case where the parallax of the left and right images is not appropriate.

BRIEF DESCRIPTION OF THE DRAWINGS

FIG. 6 is a flowchart according to image reproduction in a second embodiment;

FIG. 9 is a diagram illustrating a reference map indicating a relationship between a television size and a parallax adjustment amount; and FIG. 10 is a flowchart according to image reproduction in a fifth embodiment.

DETAILED DESCRIPTION OF THE EMBODIMENTS

Hereinafter, preferred embodiments of the presently disclosed subject matter are described in detail with reference to the accompanying drawings.

[Configuration of Stereoscopic Image Reproduction System]

Figure 1:
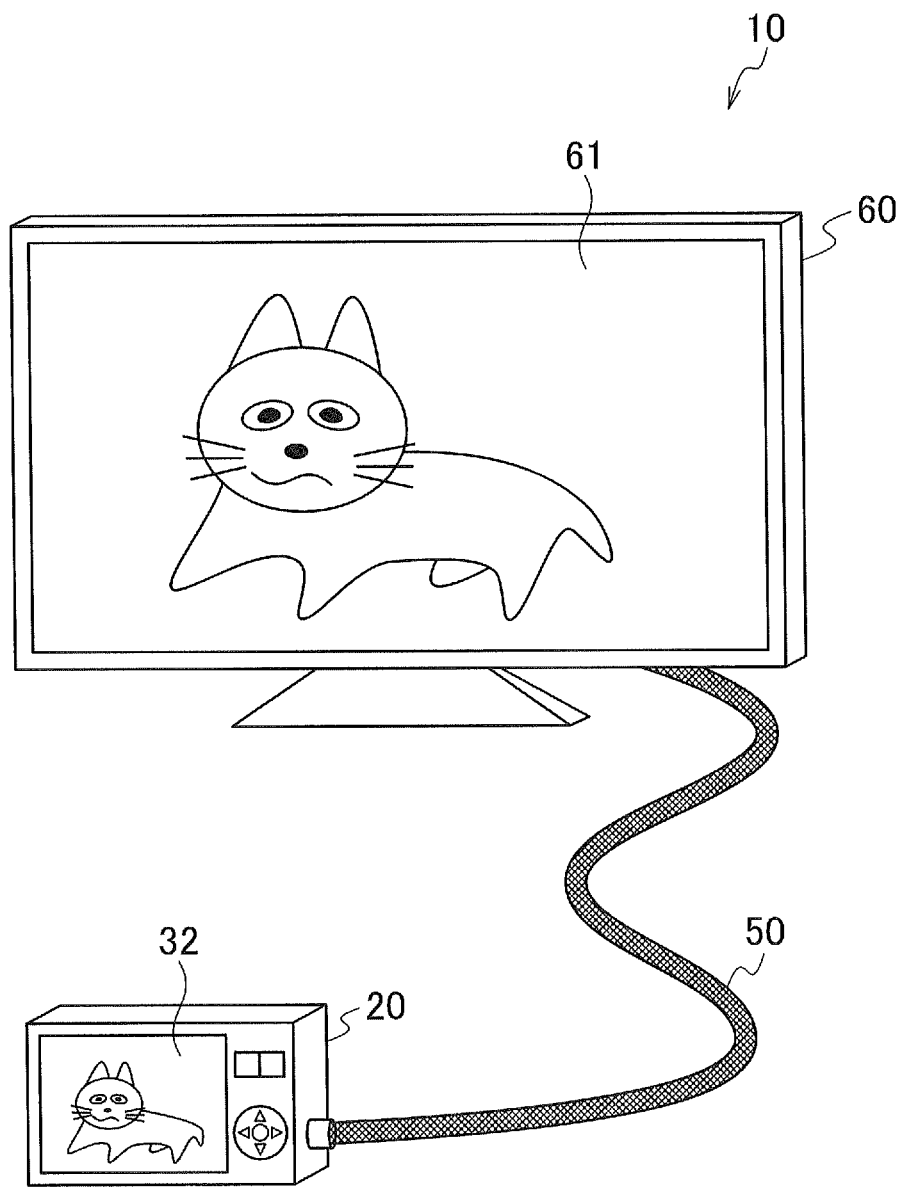
FIG. 1 is an external view of a stereoscopic image playback system.

FIG. 1 is an external view of a stereoscopic image playback system 10 according to the present embodiment. As illustrated in FIG. 1, the stereoscopic image playback system 10 includes a 3D digital camera 20 (hereinafter referred to as a camera 20) having a display unit 32, and a 3D television 60 (hereinafter referred to as a television 60) having a display unit 61. The camera 20 and the television 60 are connected with a cable 50.

Figure 2:
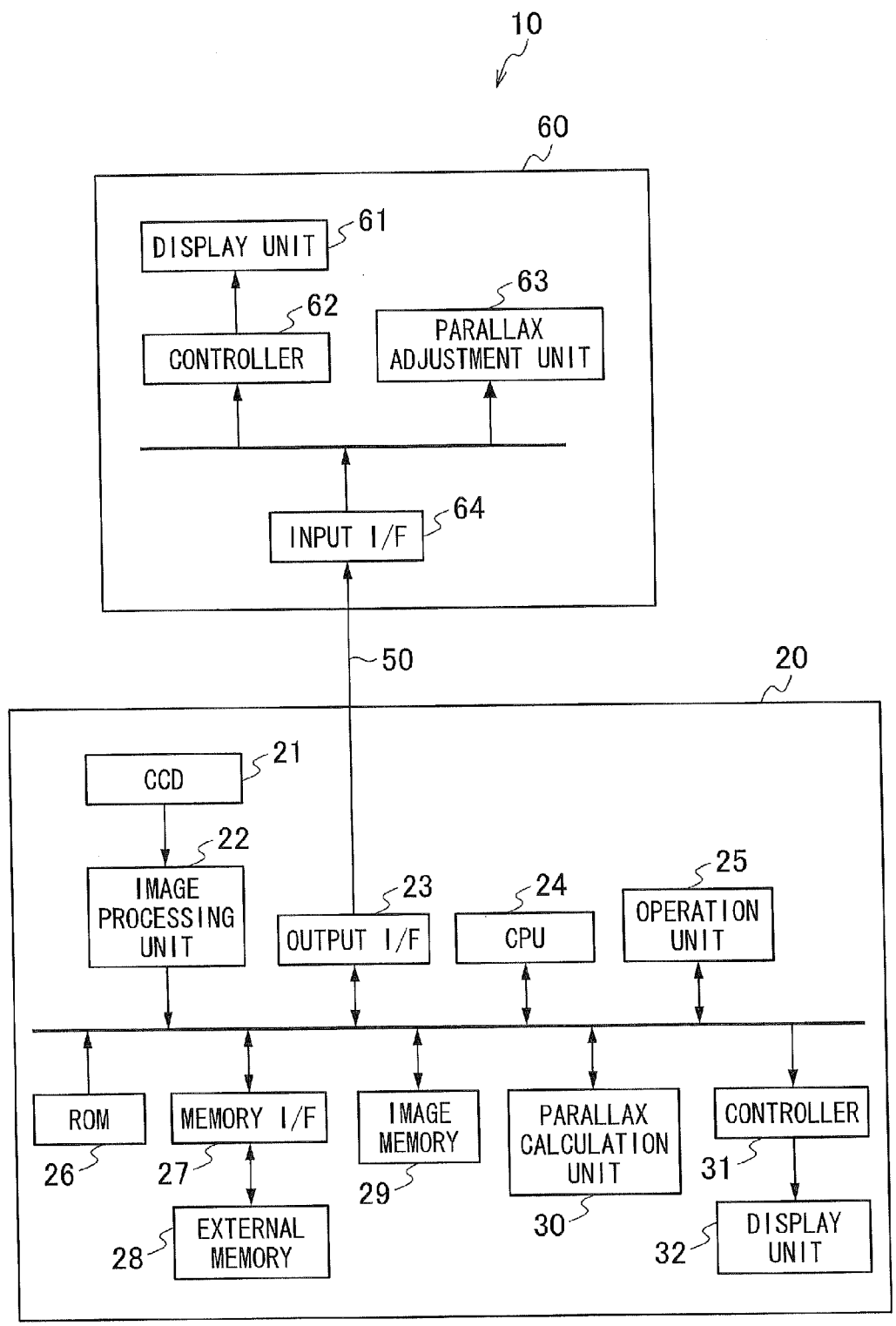
FIG. 2 is a block diagram illustrating an electrical configuration of the stereoscopic image playback system.

FIG. 2 is a block diagram illustrating an electrical configuration of the stereoscopic image playback system 10.

As illustrated in FIG. 2, the camera 20 includes a CCD 21, an image processing unit 22, an output interface 23, a CPU 24, an operation unit 25, a ROM 26, a parallax calculation unit 30 and the like. The television 60 includes the display unit 61, a parallax adjustment unit 63, an input interface 64 and the like.

The CPU 24 of the camera 20 integrally controls an entire operation of the camera 20 based on a control program stored in the ROM 26.

The CCD 21 acquires left and right images from a subject image optically received via taking lenses not illustrated which are located on right and left in the camera 20 based on an image-taking instruction from the operation unit 25 by a user. Analog image signals output from the CCD 21 are converted into digital signals in the image processing unit 22 and stored in an image memory 29.

The parallax calculation unit 30 calculates a parallax adjustment amount of the left and right images stored in the image memory 29 based on a display size (television size) information input from the operation unit 25.

The left and right images stored in the image memory 29 can be displayed on the display unit 32 via a display controller 31. The display unit 32 is a 3D display unit using a parallax barrier scheme or a lenticular scheme, on which the left and right images having a predetermined parallax input via the controller 31 are displayed in a 3D mode. In addition, the display unit 32 is used as a user interface when the user operates the operation unit 25.

Further, the left and right images stored in the image memory 29 can be output from the output interface 23 to the television 60 via the cable 50. At this time, the parallax adjustment amount of the left and right images calculated at the parallax calculation unit 30 is concurrently output.

Note that, the left and right images stored in the image memory 29 may be stored in an external memory 28 by a memory interface 27. As the external memory 28, a removable storage medium such as a memory card is used.

On the other hand, the left and right images stored in the external memory 28 may be read out to be stored in the image memory 29 via the memory interface 27. As described above, the camera 20 is configured such that an image taken by the CCD 21 and an image read from the external memory 28 can be displayed on the display unit 32 and output to the television 60.

The left and right images and the parallax adjustment amount output from the camera 20 are input to the television 60 via the input interface 64. Communication means between the camera 20 and the television 60 is not particularly limited, but an interface and the like in accordance with the HDMI (High Definition Multimedia Interface) standard, for example, may be used. Further, communication may be performed wirelessly rather than with wires.

The parallax adjustment unit 63 adjusts the parallax of the left and right images based on the input parallax adjustment amount. The left and right images having the parallax adjusted are output to the display unit 61 via a controller 62.

The display unit 61 is a 3D display unit using a parallax barrier type or a lenticular type similar to the display unit 32 of the camera 20, and displays the input left and right images in a manner that enables stereoscopic viewing. Accordingly, the user can stereoscopically view the left and right images output from the camera 20 on the display unit 61. Note that, the display unit 61 may use a scheme of stereoscopic viewing using polarized glasses and the like.

As described above, the camera 20 can reproduce and display the left and right images on the display unit of the display (television) connected with the output interface 23, and can be connected with televisions of various television sizes. The camera 20 allows the user to input the television size of the television to calculate the parallax adjustment amount depending on the input television size and outputs the calculated parallax adjustment amount together with the left and right images to the connected television so as to enable stereoscopic viewing appropriate for the television size of the connected television.

First Embodiment

Figure 3:
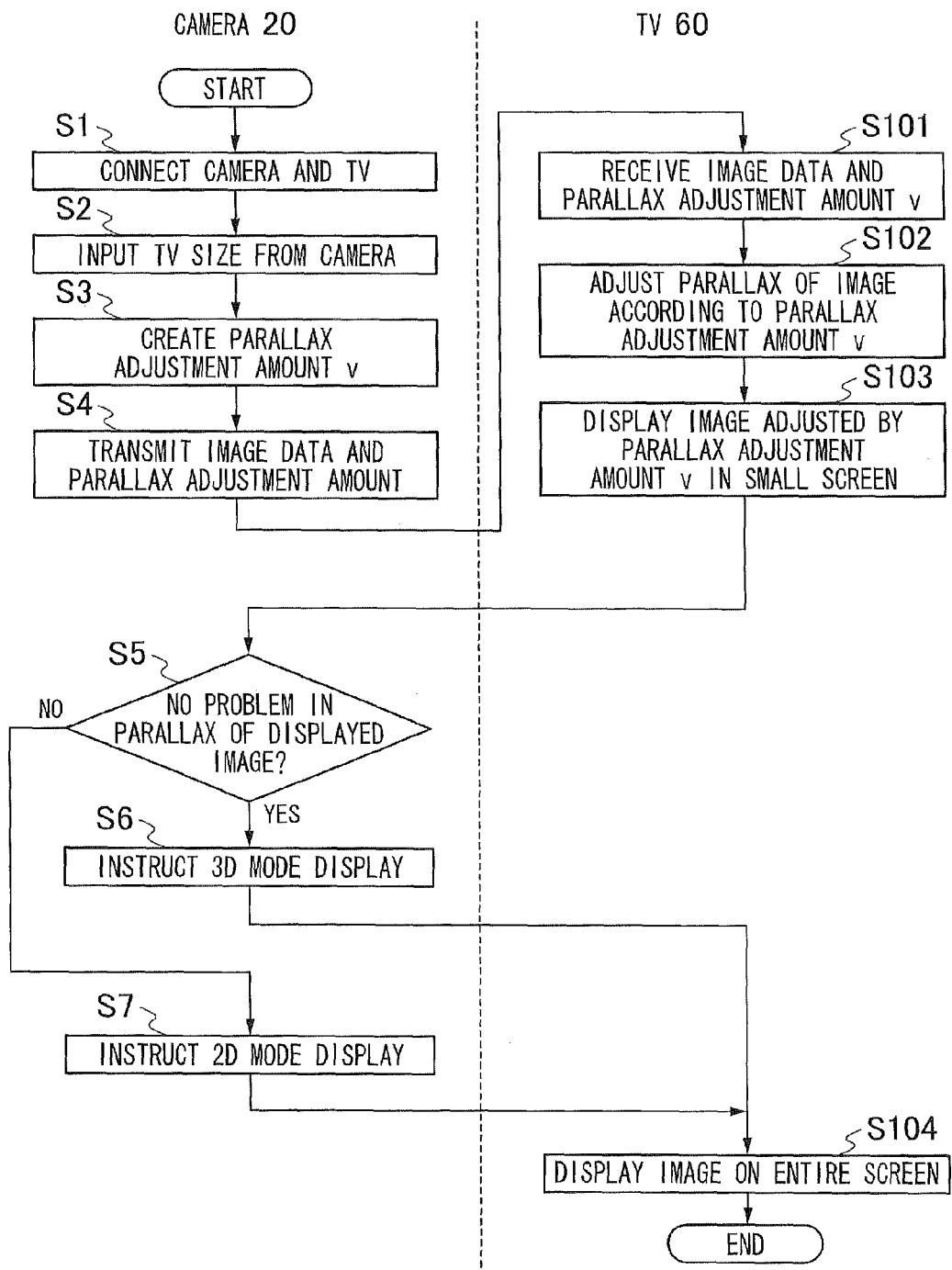
FIG. 3 is a flowchart according to image reproduction in a first embodiment.

FIG. 3 is a flowchart according to image reproduction in a first embodiment of the image reproduction system 10.

First, the camera 20 and the television 60 are connected (step S1). As described above, the camera 20 and the television 60 are connected communicably by using the cable 50.

Subsequently, the television size of the television 60 connected with the camera 20, that is, the size of the display unit 61 is input by use of the operation unit 25 of the camera 20 (step S2). The television size may be input by selection from sizes displayed as a list on the display unit 32, or a numeric value of a horizontal width or a diagonal length of the display unit 61 may directly be input.

The parallax calculation unit 30 creates a parallax adjustment amount v of the left and the right images based on the television size input in step S2 (step S3). The parallax calculation unit 30 may determine the parallax adjustment amount v with reference to a table indicating a relationship between the television size and the parallax adjustment amount, which is preliminarily stored in the ROM 26.

In addition, the parallax calculation unit 30 performs image analysis on the left and right images and extracts a predetermined subject having the largest parallax. At this time, such a subject is excluded that a distance with the camera 20 is too near for appropriate stereoscopic viewing though the subject has a large parallax.

In particular, an object that has the potential to be gazed at by the user is first extracted from the image. For example, a high frequency component or a human face is extracted. Further, distance information of the extracted object in a depth direction of an image is analyzed. The object having the largest parallax amount such as the object located on the deepest side in the depth direction of the image is extracted based on the image analysis result.

The CPU 24 creates clipped images obtained by clipping regions each including the subject having the largest parallax from respective images of the left and right images.

Note that, in the case where the extracted subject having the largest parallax is larger than the clipping region, the clipping region is not necessarily set to include the subject but the clipping region may be set, by preliminarily defining an upper limit of the size of the clipping region, within a range not exceeding the upper limit and centering the target subject.

The created parallax adjustment amount v and left and right clipped image data are transmitted to the television 60 together with the left and right image data which is to be viewed stereoscopically by the user (step S4).

The television 60 receives the parallax adjustment amount v, left and right clipped image data and the left and right images transmitted from the camera 20 (step S101), and the parallax adjustment unit 63 adjusts the parallax of the left and right clipped images depending on the parallax adjustment amount v (step S102).

Figure 4A:
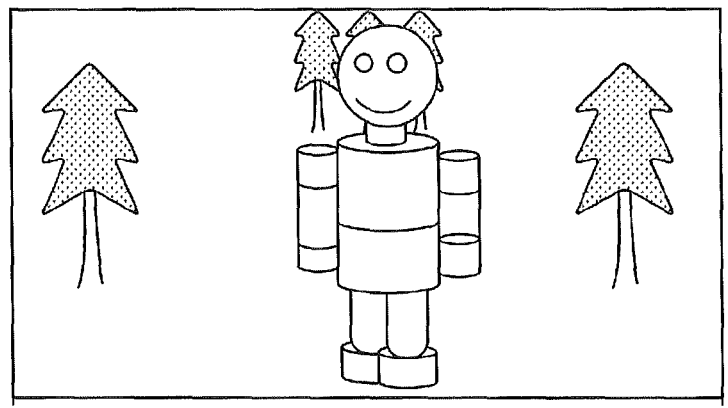
FIGS. 4A-4C are diagrams explanatory of parallax adjustment.
Figure 4B:
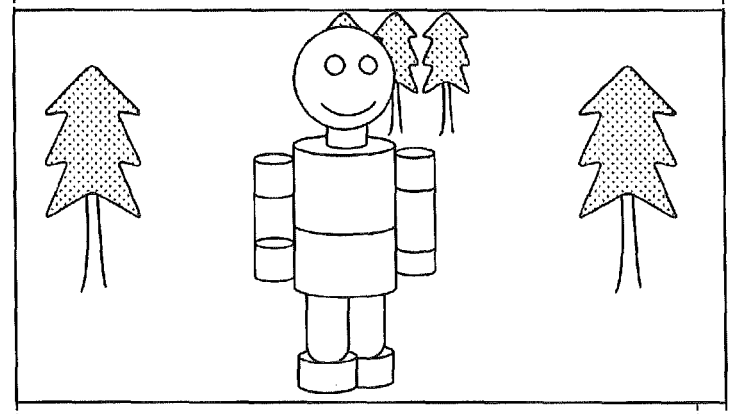
Figure 4C:
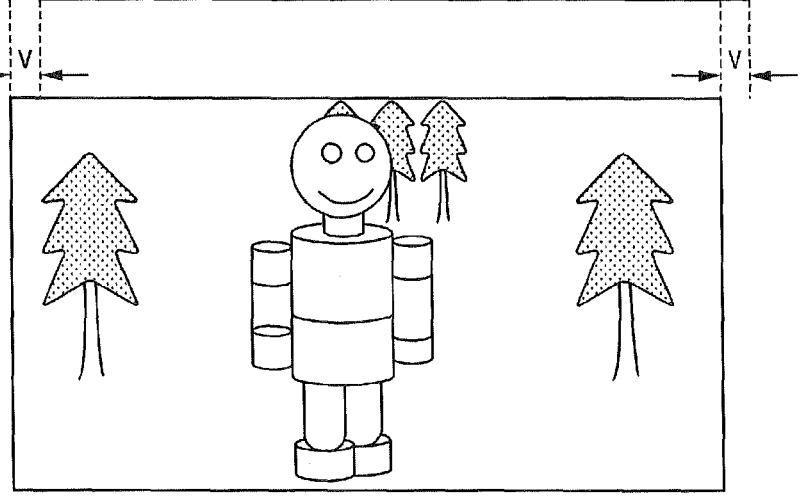
Figure 5A:
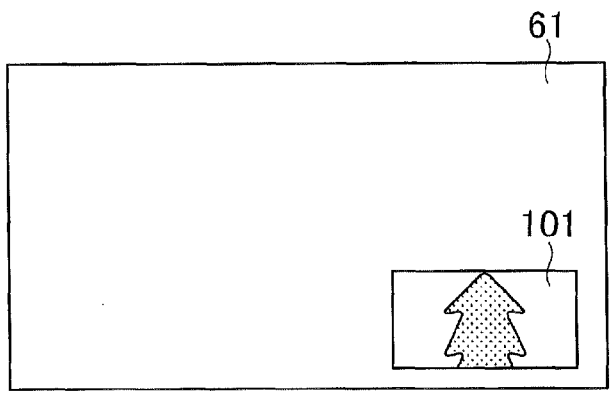
FIGS. 5A-5D are diagrams explanatory of small screen display.
Figure 5B:
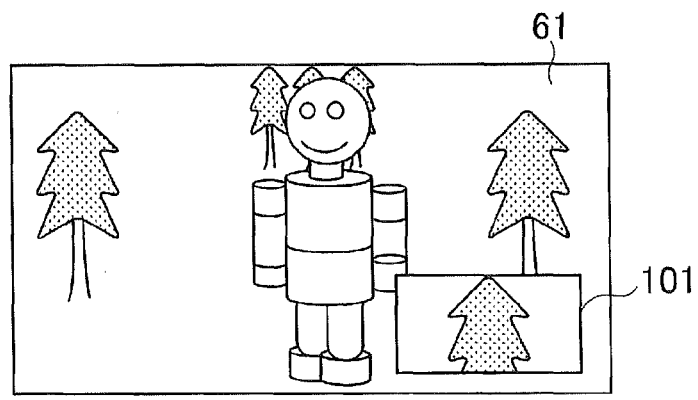
Figure 5C:
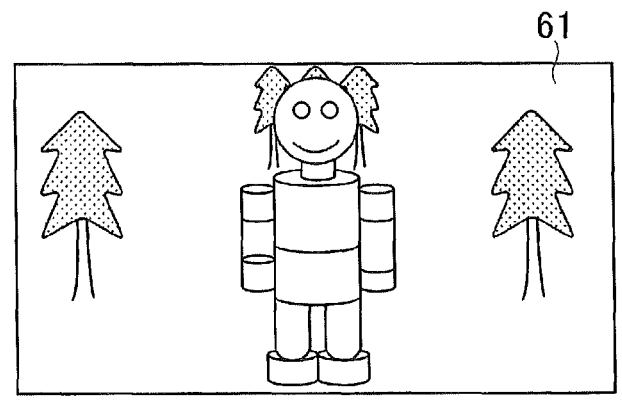
Figure 5D:
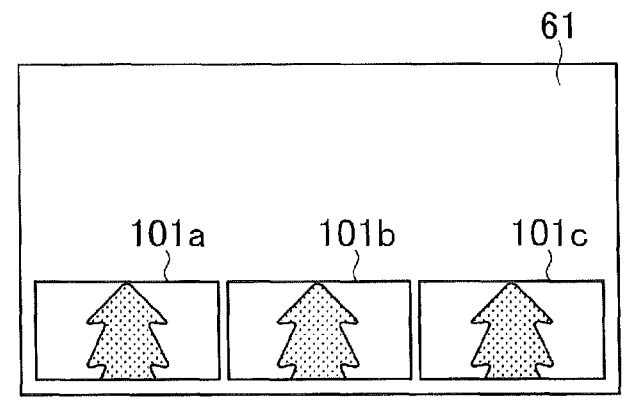

Here, parallax adjustment is described. Portion (a) of FIG. 4 illustrates a left image (image to be recognized by the left eye) of the left and right images and Portion (b) of FIG. 4 illustrates a right image (image to be recognized by the right eye). The left and right images have the parallax appropriate when viewed stereoscopically by being displayed on the display unit 32 of the camera 20. However, when viewed stereoscopically by being displayed on the display unit 61 of the television 60, the eyes may look outward since the parallax on the depth side is too large. Accordingly, the parallax calculation unit 30 calculates the parallax adjustment amount v for reducing the parallax on the depth side, and the parallax adjustment unit 63 adjusts the parallax by translating the left and right images in a horizontal direction by the parallax adjustment amount v.

Portion (c) of FIG. 4 is a diagram illustrating the right image illustrated in Portion (b) of FIG. 4 being horizontally transferred to the left by the parallax adjustment amount v. By displaying the left image illustrated in Portion (a) of FIG. 4 with the right image after parallax adjustment illustrated in Portion (c) of FIG. 4, stereoscopic display with the parallax reduced on the depth side is achieved.

Though in the embodiment, the right image is horizontally transferred to the left by the parallax adjustment amount v, the left image may be horizontally transferred to the right by the parallax adjustment amount v. Or the right image may be horizontally transferred to the left by v/2 and the left image to the right by v/2.

The left and right clipped images after parallax adjustment as described above are not displayed on all over the screen of the display unit 61 but displayed on a part of the screen as a small image 101 in a manner that enables stereoscopic viewing, as illustrated in Portion (a) of FIG. 5 (step S103). That is, among the left and right images having parallax appropriate for displaying the images on all over the screen of the display unit 61, only regions each including a subject having the largest parallax are displayed. Note that, the location on which the image 101 is displayed may be any location on the display unit 61 and may arbitrarily be determined.

In step S2, in the case where the television size is incorrectly input, there is the potential for images being displayed in a manner inappropriate for stereoscopic viewing since the parallax adjustment amount v is not appropriate. Accordingly, the left and right clipped images are not displayed on all over the screen of the display unit 61 but displayed stereoscopically (displayed in small screen) for check of whether the parallax of the left and the right images is appropriate. This is because the small screen display reduces an influence on the health even if the parallax is not appropriate and the eyes look outward.

Note that, it is preferred that the image size in the small screen display is the same or more than the size of the display unit 32 of the camera 20 and one third or less than the size of the display unit 61 of the television 60. More preferably, the image size may be the same as the size of the display unit 32 of the camera 20. In the case where the image size is the size of the display unit 32 of the camera 20, the user feels comfortable when checking the images thereby to make it easy to determine whether the parallax is appropriate.

Further, it is preferred that a range of the clipping region and the size in the small screen display are determined such that the size of the subject (subject having the largest parallax) displayed in the small screen becomes the same size as the size of the subject in the case where the entire left and right images are displayed on all over the display unit 61.

Alternatively, as illustrated in Portion (b) of FIG. 5, any one of the left and right images may be displayed on all over the display unit 61 in a 2D mode together with the clipped images 101 capable of being stereoscopically viewed. By displaying the images in the above-described manner, the user can understand a location on the entire image of the subject (subject having the largest parallax) of the image 101 displayed in the small screen. Further, the user can grasp an image when the entire image is displayed on the display unit 61 in a 3D mode.

The user checks the clipped images displayed in the small screen in a manner capable of stereoscopic viewing and inputs whether there is a problem related to stereoscopic viewing of a displayed image, that is, whether the parallax is the one capable of stereoscopic viewing through the operation unit 25 of the camera 20 (step S5).

Here, in the case where there is an input indicating that there is no problem, that is, in the case where the parallax is the one capable of stereoscopic viewing, the CPU 24 issues an instruction to the television 60 to display the entire left and right images in a 3D mode. On the contrary, in the case where there is an input indicating that there is a problem, that is, in the case where the parallax is inappropriate for stereoscopic viewing, the CPU 24 issues an instruction to the television 60 to display the entire images in a 2D mode (steps S6, 7). On receipt of the instruction, the controller 62 of the television 60 displays the image on all over the screen of the display unit 61 in the 3D mode or the 2D mode as illustrated in Portion (c) of FIG. 5 according to the instruction (step S104).

Note that, when the image is displayed in a 2D mode, either the left image or the right image may be displayed. Alternatively, characters such as "3D mode disabled" may be displayed with the image to issue a warning or only the characters may be displayed. It may be configured that the process returns to step S2 and allows the user to input the television size again in the case where there is an input indicating that there is a problem in step S5.

As described above, since it is such configured, after the television size is input, as not to display the entire image on all over the display of the television, but to display the clipped image for checking with camera display size and the like, an influence on the health can be preliminarily prevented even if the user incorrectly inputs the display size. Further, in the case where it is determined that the parallax is appropriate, the entire image is displayed on all over the display of the television in a 3D mode, the user can view the intended image stereoscopically.

Still further, by setting the size of the image for checking as the camera display size, the user can check whether the parallax is appropriate without any discomfort.

Second Embodiment

FIG. 6 is a flowchart according to image reproduction in a second embodiment of the image reproduction system 10. Note that, components in common with those in the flowchart of FIG. 3 are denoted by the same reference numerals, and the detailed description thereof is omitted.

In the present embodiment, the parallax calculation unit 30 creates three values v1, v2 and v3 regarding the parallax adjustment amount of the left and right images based on the input television size (step S13). For example, v2 is set as a typical value equal to the parallax adjustment amount v in the first embodiment, and creates v1 and v3 so as to satisfy v1<v2<v3. As described in the first embodiment, the parallax adjustment amounts v1 to v3 may be determined with reference to the table indicating the relationship between the television size and the parallax adjustment amount.

Further, the parallax calculation unit 30 analyzes, as in the first embodiment, the left and right images to extract a subject having the largest parallax and creates clipped images obtained by clipping regions each including the subject.

The camera 20 transmits the created parallax adjustment amounts v1 to v3 and the left and right clipped images together with the left and right image data which are stereoscopically viewed by the user to the television 60 (step S14) and the television 60 receives those (step S111).

The parallax adjustment unit 63 adjusts the parallax of the left and right clipped images depending on the parallax adjustment amounts v1 to v3 (step S112). That is, three kinds of stereoscopic images, the left and right clipped images having the parallax adjusted by the parallax adjustment amount v1, the left and right clipped images having the parallax adjusted by the parallax adjustment amount v2 and the left and right clipped images having the parallax adjusted by the parallax adjustment amount v3 are created. The parallax may be adjusted by translation of the left and right images in the horizontal direction as described in the first embodiment.

Subsequently, the three kinds of clipped images are displayed, as illustrated in Portion (d) of FIG. 5, on a part of the display unit 61 as images 101a to 101c in small screens (step S113). That is, the left and right clipped images having the parallax adjusted by the parallax adjustment amount v1 is displayed as the image 101a, the left and right clipped images having the parallax adjusted by the parallax adjustment amount v2 is displayed as the image 101b and the left and right clipped images having the parallax adjusted by the parallax adjustment amount v3 is displayed as the image 101c in a manner capable of stereoscopic viewing in the small screens.

Note that, locations on which the images 101a to 101c are displayed may be any locations on the display unit 61 and may arbitrarily be determined. Alternatively, any one of the left and right images may be displayed on all over the screen of the display unit 61 in a 2D mode.

As in the first embodiment, in the case where the television size is incorrectly input in step S2 and the parallax adjustment amount v is inappropriate, there is the potential for images being displayed in a manner inappropriate for stereoscopic viewing. Accordingly, by creating three kinds of parallax adjustment amounts v1 to v3 and displaying three kinds of left and right clipped images each having the parallax adjusted by respective parallax adjustment amounts as small images, the user can select the image having the appropriate parallax. Though in the case where the parallax is not appropriate and the left and right images causing the eyes to look outward are included, the image displayed in the small screen has less influence on the health.

As in the first embodiment, it is preferred that the image size of each of the images 101a to 101c is the same as the display size of the display unit 32 of the camera 20.

The user checks the three kinds of images and selects the image having the most appropriate parallax by using the operation unit 25 of the camera 20 (step S15).

The CPU 24 transmits information of the selected image to the television 60 and the controller 62 of the television 60 which receives the information of the selected image displays, as illustrated in Portion (c) of FIG. 5, the entire left and right images on all over the screen of the display unit 61 by using the parallax amount of the selected image (step S104).

Note that, in the case where none of the images 101*a* to 101*c* has appropriate parallax, it may be configured to display the images on the display unit 61 in a 2D mode by allowing the user to input that fact from the operation unit 25.

As described above, because the parallax of the left and right clipped images is adjusted by the plurality of kinds of parallax adjustment amounts after the television size is input and a plurality of images for checking are displayed with the camera display size in a selectable manner and in a manner capable of stereoscopic viewing, the user can select the image having the appropriate parallax even in the case where the user incorrectly inputs the display size.

Though in the present embodiment, three kinds of parallax adjustment amounts v1 to v3 are created and three kinds of images 101*a* to 101*c* are displayed in the small screens based on the parallax adjustment amounts v1 to v3 for allowing selection, the number of selectable images may be two or more than three.

Third Embodiment

Figure 7:
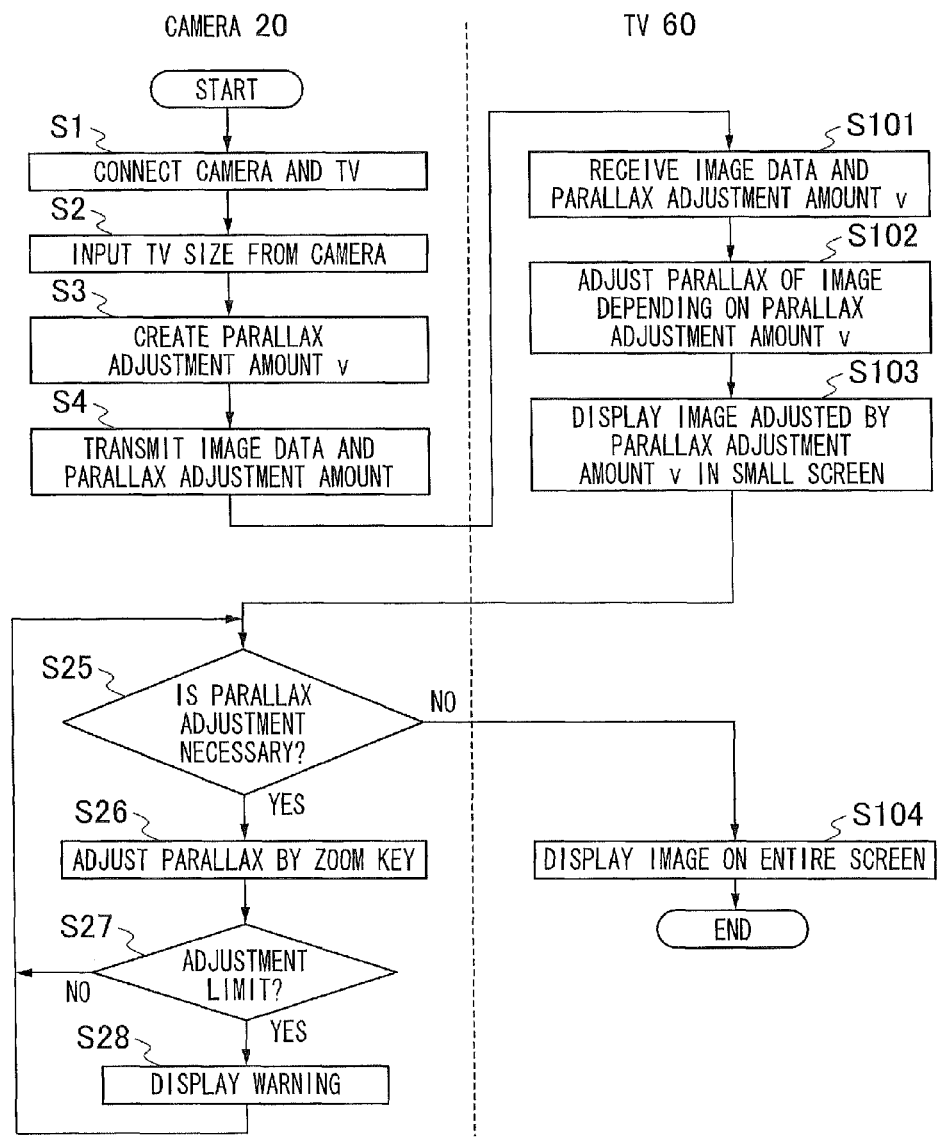
FIG. 7 is a flowchart according to image reproduction in a third embodiment.

FIG. 7 is a flowchart according to image reproduction in a third embodiment of the image reproduction system 10. Note that, components in common with those in the flowchart of FIG. 3 are denoted by the same reference numerals, and the detailed description thereof is omitted.

The present embodiment is similar to the first embodiment until the clipped images of the parallax adjustment amount v are displayed as the image 101 in the small screen on the display unit 61 (to step S103).

Here, in the case where the user determines that the parallax adjustment is necessary after checking the image 101 displayed in the small screen (step S25), the user can adjust (change) the parallax with checking the image 101 displayed in the small screen (step S26).

For example, by using, among the operation unit 25, a zoom key (not illustrated) typically used to drive a zoom lens for changing a focal point distance, the user adjusts the parallax of the image 101. Parallax adjusting is performed, as described by using FIG. 4, by translating the left and right images in a horizontal direction. As to the image 101, since the left and right images are translated in response to the operation on the zoom key, the user can check the stereoscopic effect with viewing the image 101 in real time.

At this time, in order to prevent the parallax from becoming too large due to excessive translation, an upper limit is set in a change of the parallax. In the case where the user increases the parallax to the upper limit by operating the zoom key, it is determined that adjustment of the parallax reaches a limit (step S27), translation of the left and right images is stopped so as not to increase the parallax to be more than it and a warning is displayed on the display unit 61. Even if the warning is displayed, adjustment can be naturally performed to decrease the parallax again.

When the parallax can be adjusted to the intended parallax, the user can make the entire left and right images (basic images of the clipped images 101) having the adjusted parallax displayed on the entire screen of the display unit 61 by operating a decision button (not illustrated) of the operation unit 25 (step S104).

As described above, since the user can adjust (change) the parallax with viewing the images for checking displayed in the small screens, the user can set the most appropriate parallax for the left and right images. Further, since the upper limit is set for the parallax adjustment, inappropriate parallax adjustment causing the eyes to look outward can be prevented.

Fourth Embodiment

Figure 8:
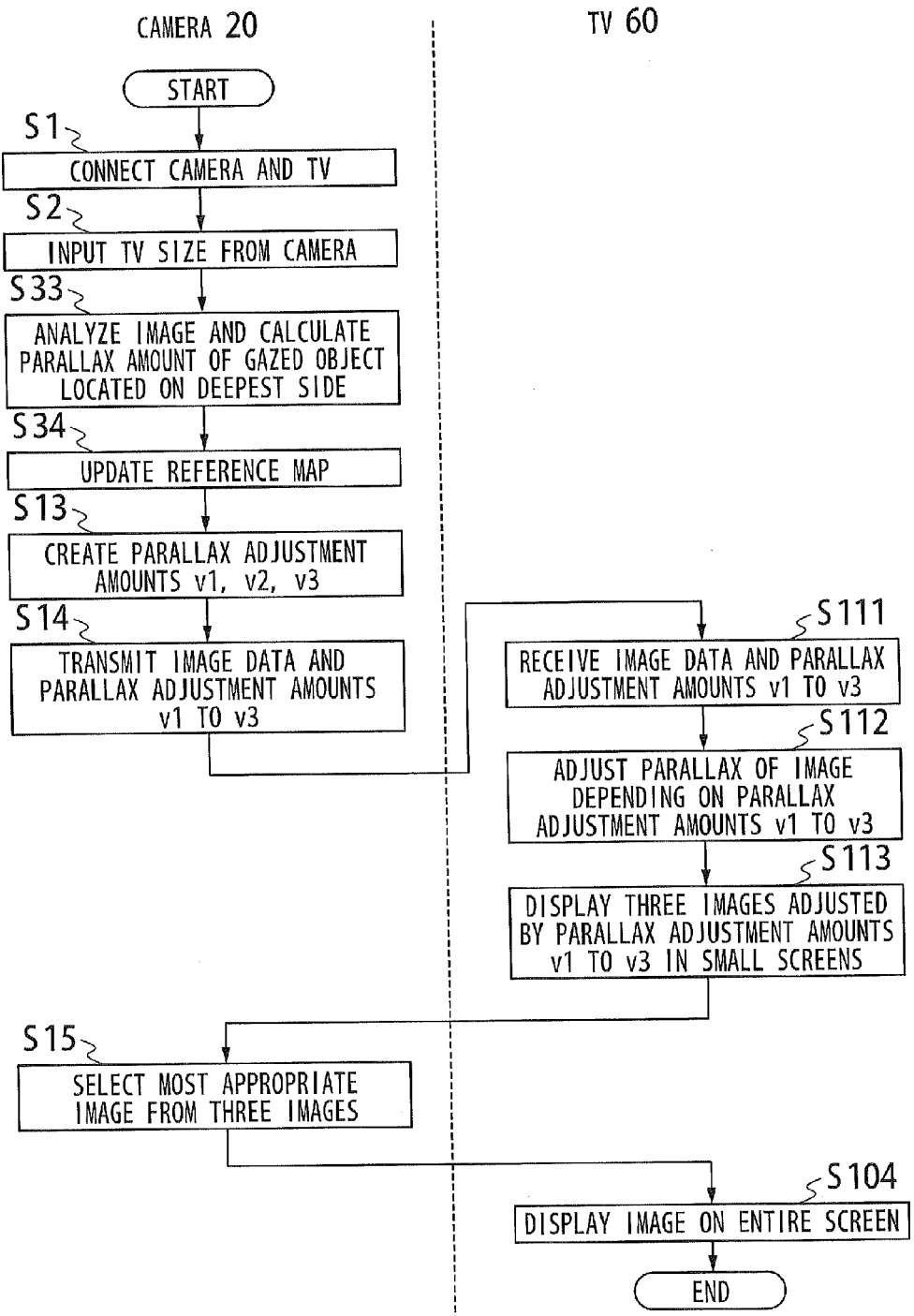
FIG. 8 is a flowchart according to image reproduction in a fourth embodiment.

FIG. 8 is a flowchart according to image reproduction in a fourth embodiment of the image reproduction system 10. Note that, components in common with those in the flowchart of FIG. 6 are denoted by the same reference numerals, and the detailed description thereof is omitted.

First, the camera 20 and the television 60 are connected (step S1), and the size of the display unit 61 of the television 60 is input (step S2).

Here, the parallax calculation unit 30 of the 3D digital camera 20 analyzes an image to be displayed on the display unit 61 of the television 60. As the details of the image analysis, an object that has the potential for being gazed at by a user is extracted from the image. For example, a high frequency component or a human face is extracted. Further, distance information of the extracted object in the depth direction of the image is analyzed.

A parallax amount of the object located on the deepest side in the depth direction of the image is calculated based on the image analysis result (step S33). Here, the reason why the parallax amount of the gazed object located on the deeper side makes an issue is that the larger parallax amount on the deeper side causes the right and left eyes to look outward as a result.

In the ROM 26, a reference map indicating a relationship between the television size and the parallax adjustment amount as illustrated in FIG. 9 is stored. A parallax calculation unit 30 updates the reference map based on the parallax amount calculated in step S33 (step S34). Moreover, the parallax calculation unit 30 creates three parallax adjustment amounts v1, v2 and v3, with reference to the updated reference map (step S13).

Further, the parallax calculation unit 30 creates a clipped image obtained by clipping a region including an object located on the deepest side.

The camera 20 transmits the created parallax adjustment amounts v1 to v3 and the left and right clipped image data together with the left and right image data viewed stereoscopically by the user to the television 60 (step S14) and the television 60 receives them (step S111).

The subsequent processing steps are similar to those in the second embodiment. That is, three kinds of clipped images having parallaxes respectively adjusted by the parallax adjustment amounts v1, v2 and v3 are displayed in small screens in a manner capable of stereoscopic viewing on a part of the display unit 61 as the images 101*a* to 101*c*. The user can select an image having an appropriate parallax from among the three images. The selected image is displayed on all over the screen of the display unit 61 in a 3D mode (step S104).

As described above, since the subject in the image to be viewed stereoscopically is analyzed, the reference map is updated depending on the parallax amount of the gazed object located on the deepest side and the parallax adjustment amount is created based on the updated reference map, stereoscopic viewing can be performed with the parallax appropriate for the images to be displayed. Further, since it is configured that a plurality of images adjusted by a plurality of parallax adjustment amounts are displayed in small screens in a manner capable of stereoscopic viewing and the user can select the image having a appropriate parallax from among those images, the user can select images having a appropriate parallax even in the case where the user incorrectly inputs the display size.

Fifth Embodiment

FIG. 10 is a flowchart according to image reproduction in a fifth embodiment of the stereoscopic image playback system 10. The present embodiment is almost similar to the third embodiment, but a parallax amount when displayed as the image 101 in small screen is determined based on an image analysis result.

That is, as in the fourth embodiment, a subject of an image to be displayed is extracted and distance information of the extracted subject in a depth direction of the image is analyzed to calculate a parallax amount of the subject located on the deepest side (step S33).

In the ROM 26, a reference map indicating a relationship between the television size and a parallax adjustment amount is stored. The parallax calculation unit 30 updates the reference map based on the parallax amount calculated in step S33 (step S34).

The parallax calculation unit 30 creates the parallax adjustment amount v with reference to the updated reference map (step S3), creates a clipped image obtained by clipping a region including the object located on the deepest side and transmits the clipped image data and the parallax adjustment amount v together with the left and right image data to be viewed stereoscopically to the television 60 (step S4).

The television 60 displays the clipped images having the parallax adjustment amount v as the image 101 in a small screen on the display unit 61 in a manner capable of stereoscopic viewing (steps S101 to S103).

The user can adjust the parallax of the image 101 by the zoom key and the like (steps S25 to S28) and causes the entire left and right images to be displayed on the entire screen of the display unit 61 after adjustment (step S104).

As described above, since when displaying an image for checking with the camera display size, the subject in the image is analyzed to determine the parallax adjustment amount after inputting the television size, the images can be displayed with the parallax appropriate to the image.

Further, since the user can adjust (change) the parallax with viewing the image for checking, the user can set the most appropriate parallax for the left and right images. Still further, since the image for checking has as small size as the display size of the camera and the like, an influence on the health until the most appropriate parallax is set can be reduced.

In each of the embodiments, the user inputs the display size of the display unit 61, but the display size may be directly acquired from the television 60. Because even in the case of acquiring the display size directly from the television 60, there may be a possibility that the parallax of the left and right images is not appropriate, small screen display has significance.

Still further, though the small screen display is achieved in the embodiments such that the television 60 displays the image received from the camera 20 with the decreased size, an image for the small screen display may be created in the camera 20. For example, image data as illustrated in Portion (a) of FIG. 5, that is, image data with a subject to be displayed on the small screen being arranged in a part and having a large margin section may be created in the camera 20 and the television 60 may display this mage on the display unit 61. In this case, parallax adjustment for the small screen display may be performed on the camera 20 side.

What is claimed is:

1. A stereoscopic image playback device configured to reproduce and display a stereoscopic image on a stereoscopic image display device, comprising:
    an image acquisition unit configured to acquire a piece of data of a stereoscopic image;
    a display size acquisition unit configured to acquire a display size of the stereoscopic image display device;
    a parallax adjustment amount creation unit configured to create, based on the acquired display size, a parallax adjustment amount for adjusting a parallax of the stereoscopic image;
    a small screen display unit configured to cause the stereoscopic image display device to display the stereoscopic image having a parallax adjusted based on the parallax adjustment amount in a small screen with a size smaller than the display size of the stereoscopic image display device;
    a determination unit configured to determine, based on the stereoscopic image displayed in the small screen, whether a stereoscopic effect of the stereoscopic image is appropriate; and
    a display control unit configured to cause, when the determination unit determines that the stereoscopic effect is appropriate, the stereoscopic image display device to display the stereoscopic image having the parallax adjusted based on the parallax adjustment amount with the display size of the stereoscopic image display device.

2. The stereoscopic image playback device according to claim 1,
    wherein the determination unit includes a selection unit configured to allow a user to select whether the stereoscopic effect is appropriate.

3. The stereoscopic image playback device according to claim 1,
    wherein the display control unit causes the stereoscopic image display device to display an image other than the stereoscopic image when the determination unit determines that the stereoscopic effect is not appropriate.

4. The stereoscopic image playback device according to claim 3,
    wherein the display control unit causes the stereoscopic image display device to display a flat image based on the piece of data of the stereoscopic image when the determination unit determines that the stereoscopic effect is not appropriate.

5. The stereoscopic image playback device according to claim 3,
    wherein the display control unit causes a warning to be displayed when the determination unit determines that the stereoscopic effect is not appropriate.

6. The stereoscopic image playback device according to claim 1,
    wherein the display size acquisition unit includes an input unit configured to allow a user to input the display size.

7. The stereoscopic image playback device according to claim 1, further comprising
    a display unit capable of reproducing and displaying a stereoscopic image,
    wherein the size smaller than the display size of the stereoscopic image display device that is caused to display the image in the small screen by the small screen display unit is the same size as a size of the display unit.

8. The stereoscopic image playback device according to claim 1, further comprising
a reference map indicating a relationship between the display size of the stereoscopic image display device and the parallax adjustment amount,
wherein the parallax adjustment amount creation unit creates the parallax adjustment amount based on the reference map.

9. The stereoscopic image playback device according to claim 1, further comprising
an image analysis unit configured to analyze a subject in the stereoscopic images,
wherein the parallax adjustment amount creation unit creates the parallax adjustment amount based on an analysis result of the image analysis unit.

10. The stereoscopic image playback device according to claim 9,
wherein the image analysis unit analyzes distance information of the subject in a depth direction of an image.

11. The stereoscopic image playback device according to claim 10,
wherein the small screen display unit clips a region including a gazed object located on a deepest side from the stereoscopic image to cause the stereoscopic image display device to display the region in the small screen.

12. The stereoscopic image playback device according to claim 1,
wherein the acquisition unit includes an image pickup unit configured to acquire a plurality of viewpoint images obtained by imaging a same subject from a plurality of viewpoints.

13. A stereoscopic image playback system comprising:
a stereoscopic image display device including a 3D display having a predetermined size; and
a stereoscopic image playback device according to claim 1.

14. A stereoscopic image playback device configured to reproduce and display a stereoscopic image on a stereoscopic image display device, comprising:
an image acquisition unit configured to acquire a piece of data of a stereoscopic image;
a display size acquisition unit configured to acquire a display size of the stereoscopic image display device;
a parallax adjustment amount creation unit configured to create, based on the acquired display size, a plurality of parallax adjustment amounts different from one another for adjusting a parallax of the stereoscopic image;
a small screen display unit configured to cause the stereoscopic image display device to display a plurality of stereoscopic images having parallaxes adjusted based on the plurality of parallax adjustment amounts in small screens each with a size smaller than the display size of the stereoscopic image display device;
an image selection unit configured to allow a user to select a stereoscopic image having the most appropriate stereoscopic effect from among the plurality of images displayed in the small screens; and
a display control unit configured to cause the stereoscopic image display device to display the selected stereoscopic image having the parallax adjusted based on the parallax adjustment amount with the display size of the stereoscopic image display device.

15. The stereoscopic image playback device according to claim 14,
wherein the display control unit causes the stereoscopic image display device to display an image other than the stereoscopic image in the case where there is no stereoscopic image having the appropriate stereoscopic effect among the plurality of images displayed in the small screens.

16. A stereoscopic image playback device configured to reproduce and display a stereoscopic image on a stereoscopic image display device, comprising:
an image acquisition unit configured to acquire a piece of data of a stereoscopic image;
a display size acquisition unit configured to acquire a display size of the stereoscopic image display device;
a parallax adjustment amount creation unit configured to create, based on the acquired display size, a parallax adjustment amount for adjusting a parallax of the stereoscopic image;
a small screen display unit configured to cause the stereoscopic image display device to display the stereoscopic image having a parallax adjusted based on the parallax adjustment amount in a small screen with a size smaller than the display size of the stereoscopic image display device;
a correction unit configured to allow a user to correct the parallax adjustment amount based on the image displayed in the small screen; and
a display control unit configured to cause the stereoscopic image display device to display the stereoscopic image having the parallax adjusted based on the corrected parallax adjustment amount with the display size of the stereoscopic image display device.

17. The stereoscopic image playback device according to claim 16,
wherein the correction unit includes a restriction unit configured to restrict a correction of a predetermined threshold value or more.

18. The stereoscopic image playback device according to claim 17,
wherein the display control unit causes the stereoscopic image display device to display a warning when a correction amount of the correction unit reaches the predetermined threshold value.

19. A stereoscopic image playback method which causes a stereoscopic image display device to reproduce and display a stereoscopic image, comprising:
an image acquisition step of acquiring a piece of data of a stereoscopic image;
a display size acquisition step of acquiring a display size of the stereoscopic image display device;
a parallax adjustment amount creation step of creating, based on the acquired display size, a parallax adjustment amount for adjusting a parallax of the stereoscopic image;
a small screen display step of causing the stereoscopic image display device to display the stereoscopic image having a parallax adjusted based on the parallax adjustment amount in a small screen with a size smaller than the display size of the stereoscopic image display device;
a determination step of determining, based on the stereoscopic image displayed in the small screen, whether a stereoscopic effect of the stereoscopic image is appropriate; and
a display control step of causing, when it is determined that the stereoscopic effect is appropriate in the determination step, the stereoscopic image display device to display the stereoscopic image having the parallax adjusted based on the parallax adjustment amount with the display size of the stereoscopic image display device.

20. A stereoscopic image playback method which causes a stereoscopic image display device to reproduce and display a stereoscopic image, comprising:
- an image acquisition step of acquiring a piece of data of a stereoscopic image;
- a display size acquisition step of acquiring a display size of the stereoscopic image display device;
- a parallax adjustment amount creation step of creating, based on the acquired display size, a plurality of parallax adjustment amounts different from one another for adjusting a parallax of the stereoscopic image;
- a small screen display step of causing the stereoscopic image display device to display a plurality of stereoscopic images having parallaxes adjusted based on the plurality of parallax adjustment amounts in small screens each with a size smaller than the display size of the stereoscopic image display device;
- an image selection step of allowing a user to select a stereoscopic image most appropriate for stereoscopic viewing from among the plurality of images displayed in the small screens; and
- a display control step of causing the stereoscopic image display device to display the selected stereoscopic image having the parallax adjusted based on the parallax adjustment amount with the display size of the stereoscopic image display device.

21. A stereoscopic image playback method which causes a stereoscopic image display device to reproduce and display a stereoscopic image, comprising:
- an image acquisition step of acquiring a piece of data of a stereoscopic image;
- a display size acquisition step of acquiring a display size of the stereoscopic image display device;
- a parallax adjustment amount creation step of creating, based on the acquired display size, a parallax adjustment amount for adjusting a parallax of the stereoscopic image;
- a small screen display step of causing the stereoscopic image display device to display the stereoscopic image having a parallax adjusted based on the parallax adjustment amount in a small screen with a size smaller than the display size of the stereoscopic image display device;
- a correction step of allowing a user to correct the parallax adjustment amount based on the image displayed in the small screen; and
- a display control step of causing the stereoscopic image display device to display the stereoscopic image having the parallax adjusted based on the corrected parallax adjustment amount with the display size of the stereoscopic image display device.

* * * * *